(12) United States Patent
Strack et al.

(10) Patent No.: US 7,340,348 B2
(45) Date of Patent: Mar. 4, 2008

(54) METHOD FOR ACQUIRING AND INTERPRETING SEISMOELECTRIC AND ELECTROSEISMIC DATA

(75) Inventors: Kurt M. Strack, Houston, TX (US); Norman C. Allegar, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 43 days.

(21) Appl. No.: 11/453,756

(22) Filed: Jun. 15, 2006

(65) Prior Publication Data

US 2007/0294036 A1    Dec. 20, 2007

(51) Int. Cl.
*G01V 1/28* (2006.01)
(52) U.S. Cl. ....................................................... 702/14
(58) Field of Classification Search ................ 702/14, 702/16, 17, 18; 367/21, 23
See application file for complete search history.

(56) References Cited

U.S. PATENT DOCUMENTS

| | | | |
|---|---|---|---|
| 5,486,764 A * | 1/1996 | Thompson et al. | ......... 324/323 |
| 5,563,513 A | 10/1996 | Tasci et al. | |
| 5,647,018 A | 7/1997 | Benjamin | |
| 5,877,995 A | 3/1999 | Thompson et al. | |
| 6,476,608 B1 * | 11/2002 | Dong | ......................... 324/323 |
| 6,541,975 B2 | 4/2003 | Strack | |
| 6,603,313 B1 | 8/2003 | Srnka | |
| 6,628,110 B2 | 9/2003 | Zafarana et al. | |
| 6,670,813 B2 | 12/2003 | Strack | |
| 6,739,165 B1 | 5/2004 | Strack | |
| 6,842,006 B2 | 1/2005 | Conti et al. | |
| 6,857,038 B2 | 2/2005 | Liu et al. | |
| 2005/0077902 A1 | 4/2005 | Macgregor et al. | |

* cited by examiner

*Primary Examiner*—Donald E McElheny, Jr.
(74) *Attorney, Agent, or Firm*—Richard A. Fagin

(57) ABSTRACT

A method for subsurface Earth surveying includes acquiring seismic data over a selected region of the Earth's subsurface. Seismoelectric data are acquired over a selected region of the Earth's subsurface. Electroseismic data are also acquired over a selected region of the Earth's subsurface. At least one type of electromagnetic survey data is acquired over a selected region of the Earth's subsurface. Survey volumes of the seismic data, the seismoelectric data, the electroseismic data and the electromagnetic data are matched, and a model of the Earth's subsurface is generated that accounts for all of the seismic data, the seismoelectric data, the electroseismic data and the electromagnetic data.

37 Claims, 14 Drawing Sheets

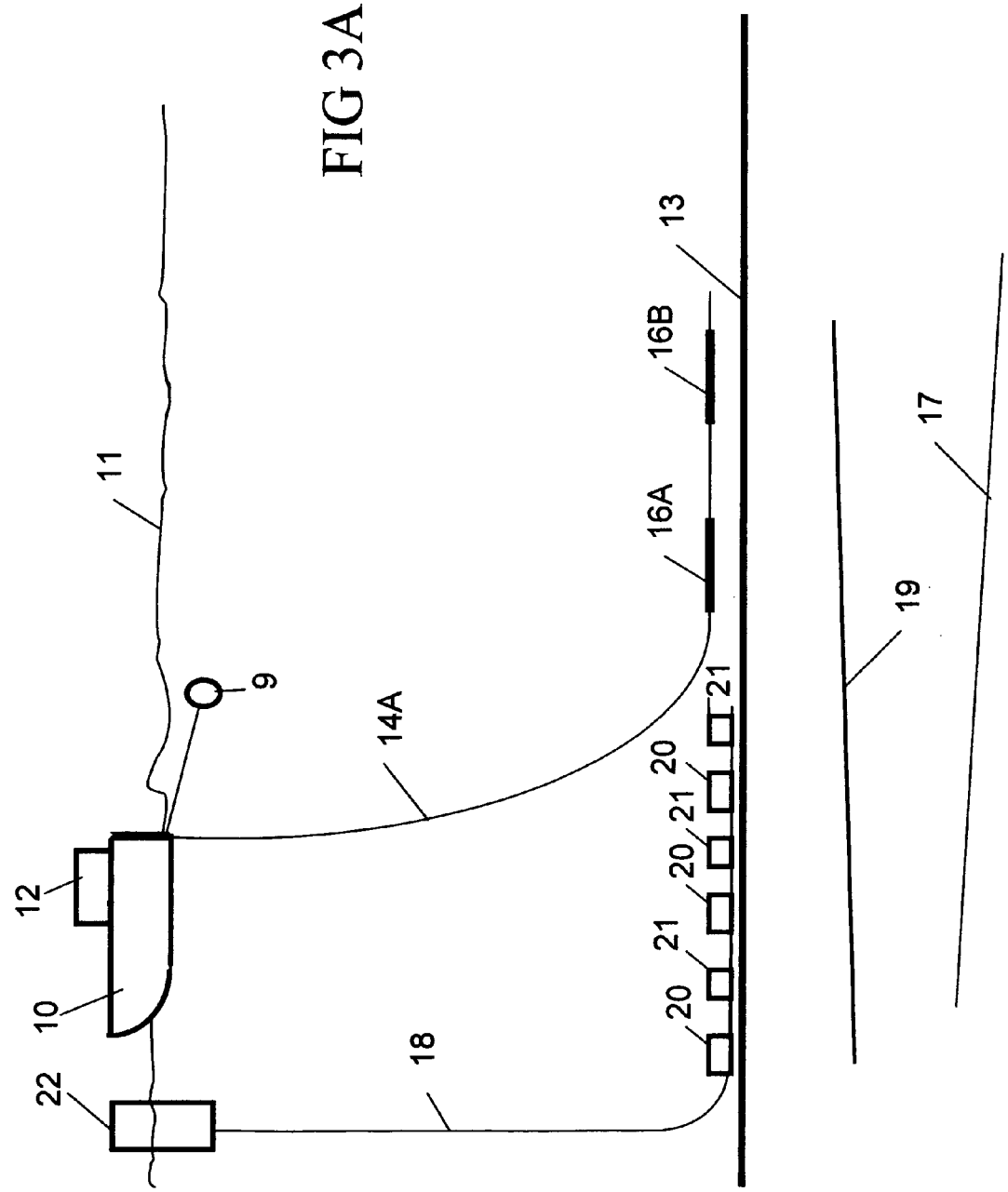

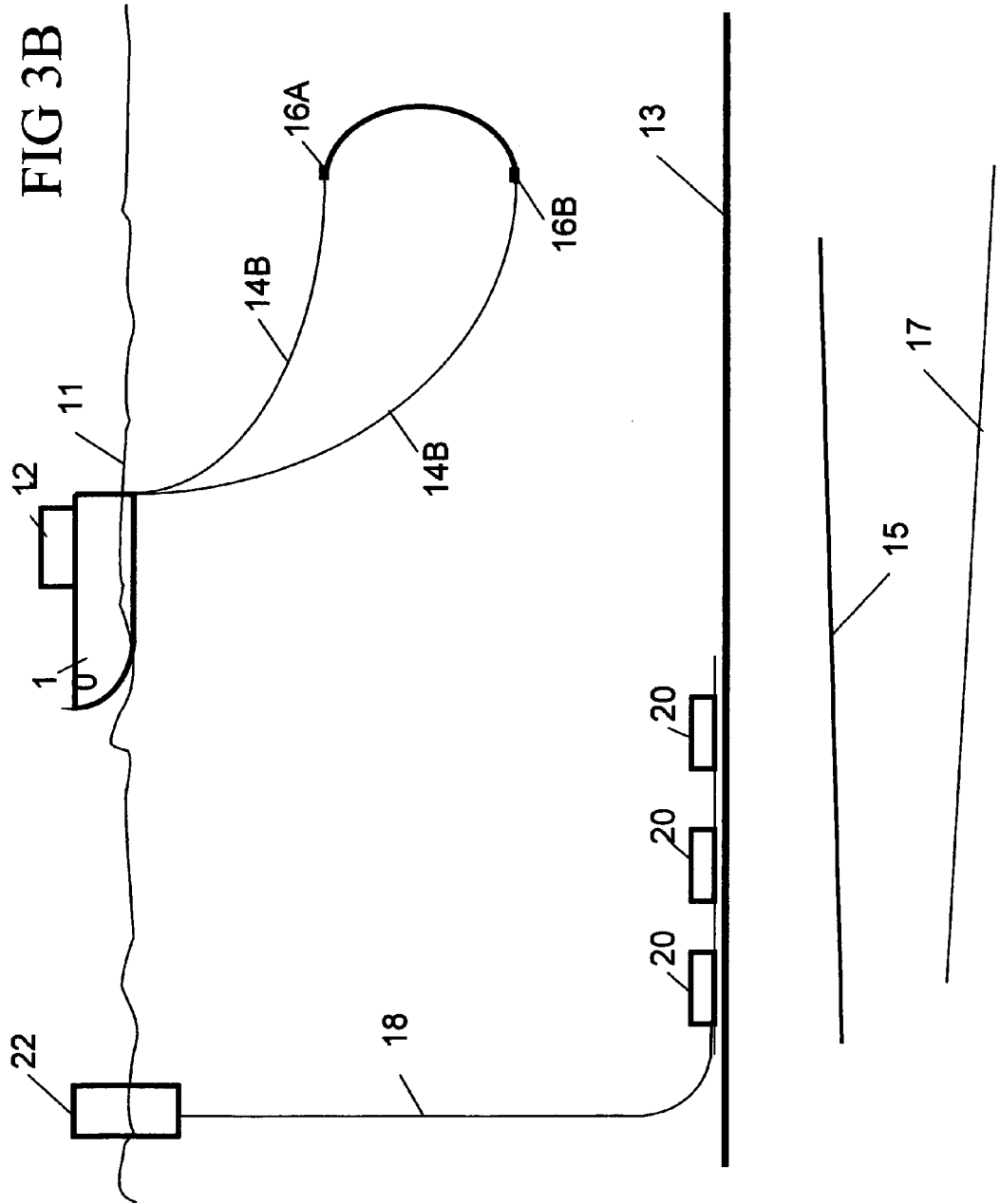

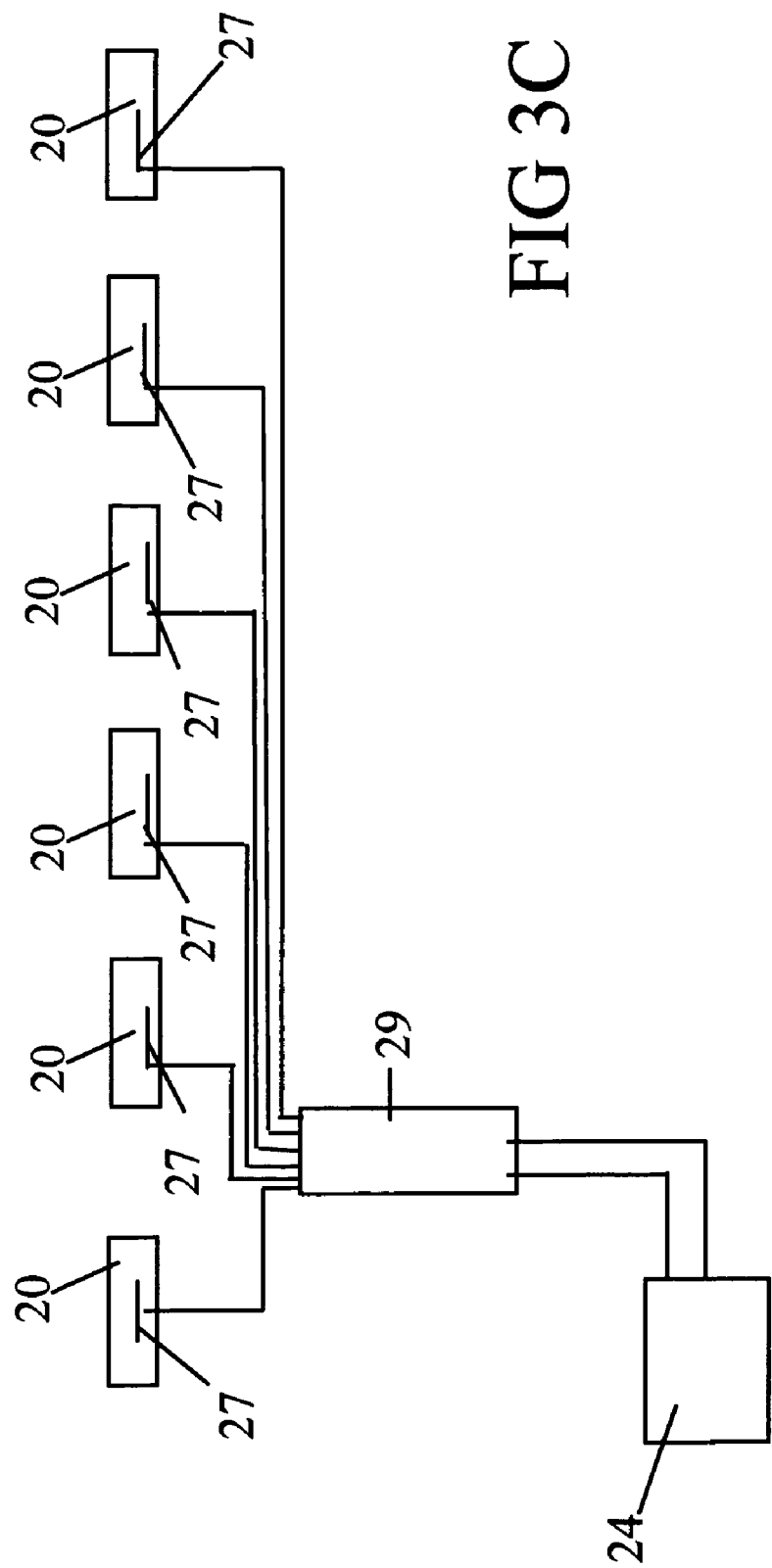

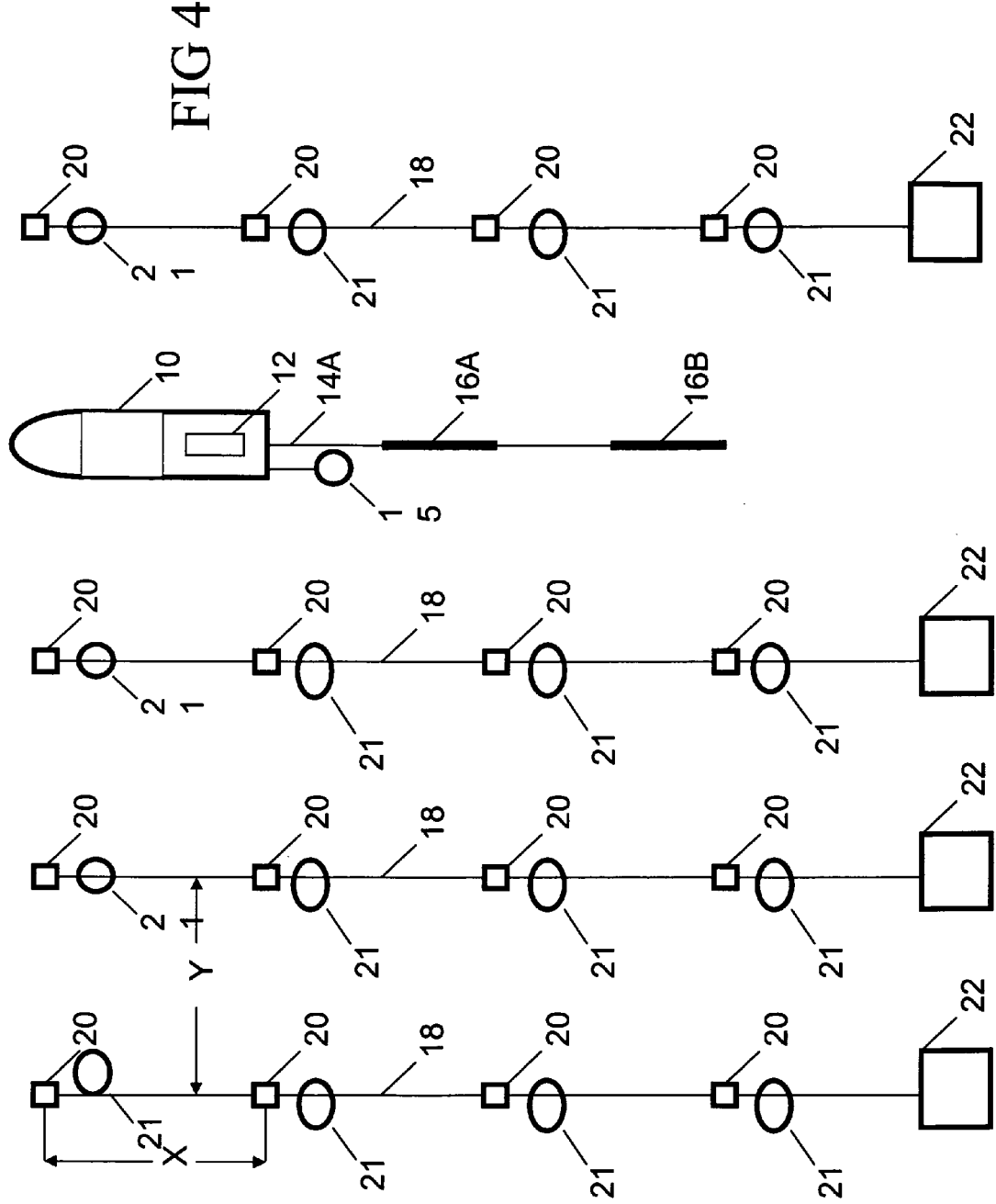

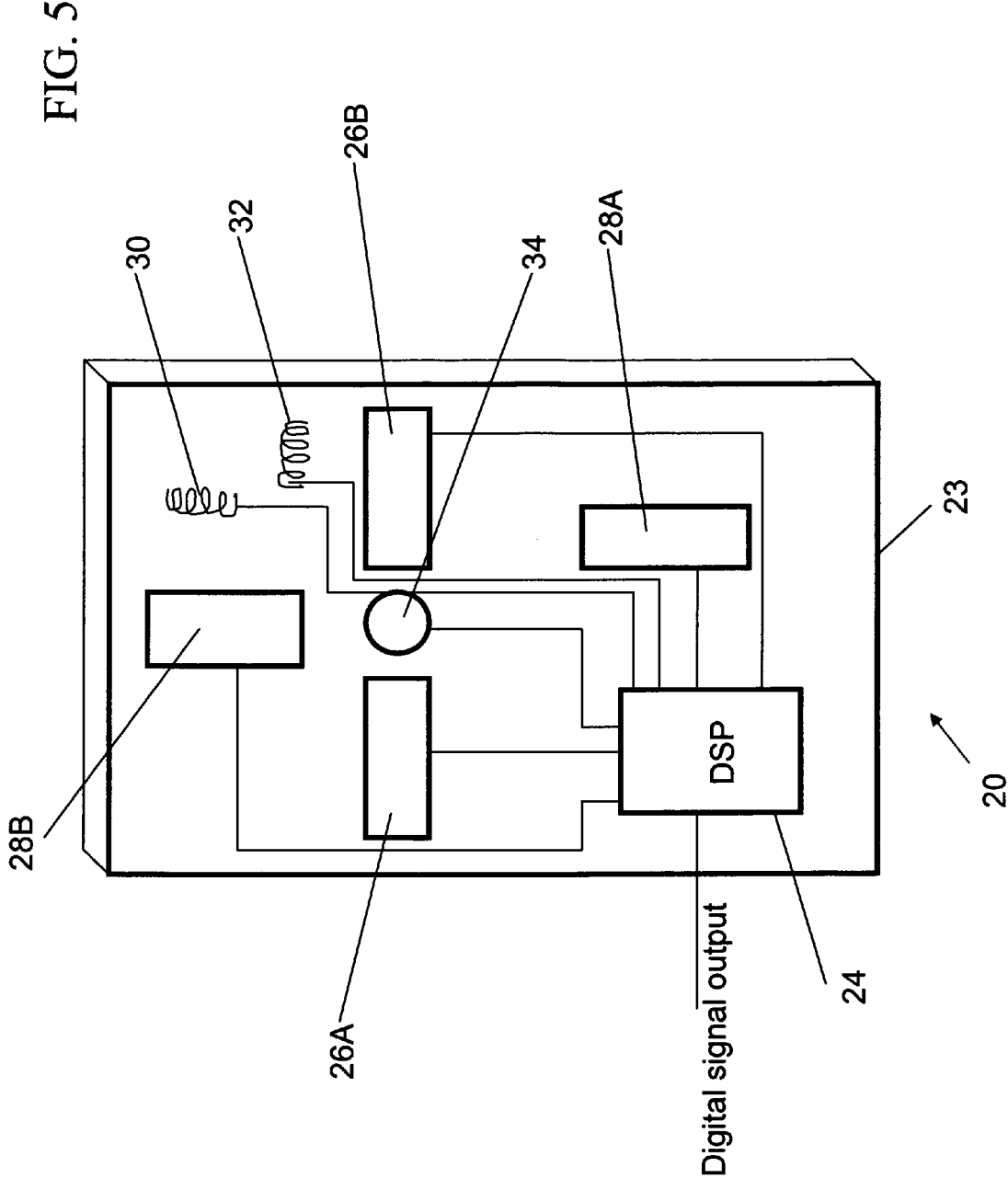

METHOD FOR ACQUIRING AND INTERPRETING SEISMOELECTRIC AND ELECTROSEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismoelectric and electroseismic surveying of the Earth's subsurface. More specifically, the invention relates to methods for acquiring electroseismic and seismoelectric surveys such that subsurface features may be more readily identified.

2. Background Art

Electromagnetic geophysical surveying known in the art includes "controlled source" electromagnetic surveying. Controlled source electromagnetic surveying includes imparting an electric field or a magnetic field into the Earth formations, those formations being below the sea floor in marine surveys, and measuring properties of electric fields and/or magnetic fields induced in response. The electric and/or magnetic field properties are measured by measuring voltages induced in electrodes, antennas and/or interrogating magnetometers disposed at the Earth's surface, or on or above the sea floor. The electric and/or magnetic field properties are used to make inferences about the spatial distribution of electrical conductivity of the Earth's subsurface.

Controlled source electromagnetic surveying known in the art includes imparting alternating electric current into formations below the sea floor. The alternating current has one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217.

Following are described several patent publications which describe various aspects of electromagnetic subsurface Earth surveying. U.S. Pat. No. 5,770,945 issued to Constable describes a magnetotelluric (MT) system for sea floor petroleum exploration. The disclosed system includes a first waterproof pressure case containing a processor, AC-coupled magnetic field post-amplifiers and electric field amplifiers, a second waterproof pressure case containing an acoustic navigation/release system, four silver-silver chloride electrodes mounted on booms and at least two magnetic induction coil sensors. These elements are mounted together on a plastic and aluminum frame along with flotation devices and an anchor for deployment to the sea floor. The acoustic navigation/release system serves to locate the measurement system by responding to acoustic "pings" generated by a ship-board unit, and receives a release command which initiates detachment from the anchor so that the buoyant package floats to the surface for recovery. The electrodes used to detect the electric field are configured as grounded dipole antennas. Booms by which the electrodes are mounted onto a frame are positioned in a configuration to create two orthogonal dipoles. The two orthogonal dipoles are used to measure the complete vector electric field. The magnetic field sensors are multi-turn, Mu-metal core wire coils which detect magnetic fields within the frequency range typically used for land-based MT surveys. The magnetic field coils are encased in waterproof pressure cases and are connected to the logger package by high pressure waterproof cables. The logger unit includes amplifiers for amplifying the signals received from the various sensors, which signals are then provided to the processor which controls timing, logging, storing and power switching operations. Temporary and mass storage is provided within and/or peripherally to the processor. There is no active source in such MT methods, which rely upon naturally occurring EM fields.

U.S. Pat. No. 6,603,313 B1 issued to Srnka discloses a method for surface estimation of reservoir properties, in which average earth resistivities above, below, and horizontally adjacent to specifically located subsurface geologic formations are first determined or estimated using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near the sea floor, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness (fractional volume in the formation of clay-bearing rocks called "shale") properties.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

U.S. Pat. No. 6,541,975 B2 issued to Strack discloses a system for generating an image of an Earth formation surrounding a borehole penetrating the formation. Resistivity of the formation is measured using a DC measurement, and conductivity and resistivity of the formations are measured with a time domain signal or AC measurement. Acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation.

International Patent Application Publication No. WO 0157555 A1 discloses a system for detecting a subterranean reservoir or determining the nature of a subterranean reservoir whose position and geometry is known from previous seismic surveys. An electromagnetic field is applied by a transmitter on the seabed and is detected by antennae also on the seabed. A refracted wave component is sought in the wave field response, to determine the nature of any reservoir present.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the same or different receivers. The invention also relates to planning a survey using this method, and to analysis of survey data taken in combination so as to allow the galvanic contribution to the signals collected at the receiver to be contrasted with the inductive effects, and the effects of signal attenuation (which are highly dependent on local properties of the rock formation, overlying water, and air at the survey area). This is very important to the success of using electromagnetic surveying for identifying hydrocarbon reserves and distinguishing them from other classes of subsurface formations.

U.S. Pat. No. 6,842,006 B1 issued to Conti et al. discloses a sea-floor electromagnetic measurement device for obtaining underwater magnetotelluric (MT) measurements of earth formations. The device includes a central structure with arms pivotally attached thereto. The pivoting arms enable easy deployment and storage of the device. Electrodes and magnetometers are attached to each arm for measuring electric and magnetic fields respectively, the magnetometers being distant from the central structure such that magnetic fields present therein are not sensed. A method for undertaking sea floor measurements includes measuring electric fields at a distance from the structure and measuring magnetic fields at the same location.

U.S. Patent Application Publication No. 2004/232917 relates to a method of mapping subsurface resistivity contrasts by making multichannel transient electromagnetic (MTEM) measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit.

U.S. Pat. No. 5,563,913 issued to Tasci et al. discloses a method and apparatus used in providing resistivity measurement data of a sedimentary subsurface. The data are used for developing and mapping an enhanced anomalous resistivity pattern. The enhanced subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that areal contour maps and cross sections of the resistivity variations of the subsurface formations can be prepared.

A limitation to f-CSEM techniques known in the art is that they are typically limited to relatively great water depth, on the order of 800-1,000 meters, or a ratio of ocean water depth to subsurface reservoir depth (reservoir depth measured from the sea floor) of greater than about 1.5 to 2.0.

A typical f-CSEM marine survey can be described as follows. A recording vessel includes cables which connect to electrodes disposed near the sea floor. An electric power source on the vessel charges the electrodes such that a selected magnitude of alternating current, of selected frequency or frequencies, flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface (or sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching strategies are possible; as will be explained in more detail below. Structure of the subsurface is inferred by the time distribution of the induced voltages and/or magnetic fields. t-CSEM techniques are described, for example, in Strack, K.-M., 1992, Exploration with deep transient electromagnetics, Elsevier, 373 pp. (reprinted 1999).

Other techniques used to make inferences about the structure and composition of the formations in the Earth's subsurface include seismoelectric surveying and electroseismic surveying. Electroseismic surveying is described in U.S. Pat. No. 5,486,764 issued to Thompson et al., which method and apparatus for estimating the Earth's resistance (conductivity) as a function of depth. Resistance is determined by the frequency-dependent attenuation of reflected electromagnetic (EM) signals which are produced by application of seismic signals to the Earth. A seismic wave is applied by conventional means into the Earth, and EM waves propagate back to the Earth's surface from different reflectors at different depth levels in the subsurface. The propagation back through the Earth attenuates the high frequencies preferentially. EM waves generated at lower depths are more attenuated relative to those waves generated at shallower depths. The method and apparatus described in the Thompson '764 patent determines the difference in spectral content between the reflected EM signals from different horizons based on their relative attenuation, and uses these differences as a direct measure of the conductivity between the reflective horizons. Inverse electroseismic prospecting techniques can be used to impart EM waves into the Earth and use reflected seismic waves to determine electrical resistance as a function of depth. The '764 patent also describes the inverse process, called seismoelectric prospecting, in which seismic waves are imparted into the Earth and induced voltages are detected in response thereto.

U.S. Pat. No. 5,841,280 issued to Yu et al. describes a seismoelectric well logging instrument and method for using such instrument. The method disclosed is for estimating porosity of an earth formation from measurements of acoustic energy traversing the earth formation and from measurements of seismoelectric voltages generated in the formation in response to the acoustic energy. The method includes the steps of measuring the acoustic energy traversing the earth formation and measuring the seismoelectric voltages generated in response to the acoustic energy traversing the formation. A seismoelectric signal is synthesized from the measurements of the acoustic energy using an initial value of the porosity. A difference is determined between the synthesized seismoelectric voltages and the measured seismoelectric voltages. The initial value of porosity is adjusted, and the steps of synthesizing the seismoelectric voltages from the acoustic signal, determining the difference, and adjusting the value of porosity are repeated until the difference drops below a predetermined threshold or the difference reaches a minimum value. The adjusted value of porosity which results in the difference being at the minimum is taken as the formation porosity. In a particular embodiment, the electrical conductivity of fluid in pore spaces of the earth formations can be calculated. The particular embodiment includes the steps of measuring the acoustic energy traversing the earth formation and measuring the seismoelectric voltages generated in response to the acoustic energy traversing the formation. A seismoelectric signal is synthesized from the measurements of the acoustic energy using an initial value of fluid electrical conductivity. A difference is determined between the synthesized seismoelectric voltages and the measured seismoelectric voltages. The initial value of fluid electrical conductivity is adjusted, and the steps of synthesizing the seismoelectric voltages from the acoustic signal, determining the difference, and adjusting the value of conductivity are repeated until the difference drops below a predetermined threshold or the difference reaches a minimum value. The adjusted value of fluid electrical conductivity which results in the difference being at the minimum is taken as the fluid electrical conductivity.

The origin of seismoelectric signals is shown in FIG. 1A and FIG. 1B. FIG. 1A shows how Stoneley waves traveling through a borehole drilled through a permeable Earth formation can displace electrically conductive fluid in the pore spaces of the formation. Displacement of the fluid in the pore spaces causes an electric field to be generated. FIG. 1B shows Stoneley waves moving along a borehole that penetrates a fractured Earth formation. Fluid in the fracture is displaced by the action of the Stoneley waves and generates an electromagnetic field in response. FIG. 2A shows a seismic (acoustic pressure or compressional wave) reflection response from the Earth to imparted seismic energy. FIG. 2B shows seismoelectric response of the same region of the Earth's subsurface, showing a degree of correspondence between seismic response and seismoelectric response of the Earth.

Adapting the foregoing electroseismic and seismoelectric techniques to surveying from the Earth's surface or from the surface of a body of water is known in the art. Each of the techniques described above, including controlled source electromagnetic surveying, electroseismic surveying and seismoelectric surveying, and although not described above, but equally applicable to this description, seismic surveying known in the art, are each responsive to different characteristics of the formations in the Earth's subsurface. Combining the results of all of the foregoing survey techniques can provide improved analysis of the structure and composition of the formations in the Earth's subsurface. However, conducting four or more different types of surveys over the same area of the Earth's subsurface can be time consuming and expensive. Each of the foregoing techniques also investigates different volume in the Earth's subsurface with respect to the placement of the respective energy sources and detecting devices used therewith. Such differing volumes of investigation have made combining acquisition and combining results of the techniques to be impractical. What is needed is a method and system to combine various surface electric and seismic survey techniques to improve the quality of analysis of the Earth's subsurface. At the same time, integration of such interpretations with borehole or fluid injection/production measurements is required to provide results that are grounded in actual subsurface measurements, and/or fluid production information.

SUMMARY OF THE INVENTION

One aspect of the invention is a method for subsurface Earth surveying. A method according to this aspect of the invention includes acquiring seismic data over a selected region of the Earth's subsurface. Seismoelectric data are acquired over a selected region of the Earth's subsurface. Electroseismic data are also acquired over a selected region of the Earth's subsurface. At least one type of electromagnetic survey data is acquired over a selected region of the Earth's subsurface. Survey volumes of the seismic data, the seismoelectric data, the electroseismic data and the electromagnetic data are matched, and a model of the Earth's subsurface is generated that accounts for all of the seismic data, the seismoelectric data, the electroseismic data and the telectromagnetic data.

Combining the characteristics of the various survey methods in a systematic fashion allows a synergetic approach to subsurface imaging.

Other aspects and advantages of the invention will be apparent from the following description and the appended claims.

BRIEF DESCRIPTION OF THE DRAWINGS

FIG. 3A shows a marine transient electromagnetic survey system using a horizontal electric dipole current source. The system also includes a seismic source and seismic receivers.

FIG. 3B shows a marine transient electromagnetic survey system using a vertical electric dipole current source.

FIG. 3C shows a switching arrangement for selectively coupling spaced apart acquisition nodes to each other and to a voltage or velocity/acceleration measuring device.

FIG. 4 shows an array of t-CSEM sensors disposed in a plurality of ocean bottom cables or as nodes for acquiring a survey according to the invention.

FIG. 5 shows one embodiment of a single ocean bottom t-CSEM acquisition system.

DETAILED DESCRIPTION

Figure 1B:
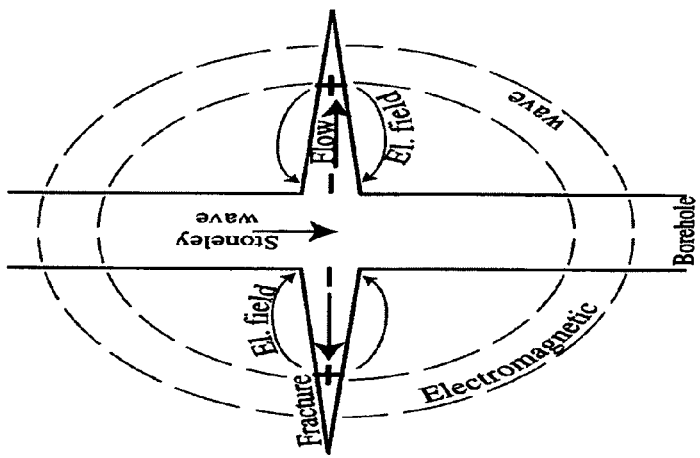
FIG. 1B shows a graphic representation of seismoelectric response of a fractured Earth formation.

Aside from logistical details, the techniques discussed herein are equally applicable to both marine and land surveys, although most of the description is made with reference to marine surveys. Accordingly, the invention is not limited in scope to use only with marine surveys.

Generally, an acquisition system that may be used in various aspects of the invention includes a seismic energy source, seismic sensors, an electric and/or magnetic field source, and electric and/or magnetic field sensors. FIG. 3A shows one embodiment of such a system for use with methods according to various aspects of the invention. The system includes a survey vessel 10 that moves in a predetermined pattern along the surface of a body of water 11 such as a lake or the ocean. The vessel 10 includes thereon seismic and electromagnetic (EM) source actuation, signal recording and navigation equipment, shown generally at 12 and referred to collectively herein as the "control/recording system." The control/recording system 12 includes a controllable source of electric current (not shown separately) that is used to energize transmitter electrodes 16A 16B towed in the water 11, preferably near the bottom 13 thereof, to impart an electric field into subsurface formations 15, 17 below the bottom 13 of the water 11. The control/recording system 12 typically includes instrumentation (not shown separately) to determine the geodetic position of the vessel 10 at any time, such as can be performed using global positioning system (GPS) receivers or the like.

The control/recording system 12 in the present embodiment can include equipment to transfer signals between the recording system 12 and one or more recording buoys 22. The recording buoys 22 receive and store signals from each of a plurality of electromagnetic (EM) sensors 20 positioned at selected positions on the water bottom 13. The sensors 20 may be disposed along a cable 18. The cable 18 may be of a type ordinarily used in connection with seismic sensors deployed on the water bottom known in the art as "ocean bottom cables." The EM sensors 20 are configured to detect electric and/or magnetic fields that result from electric fields induced in the Earth's subsurface by electric current passing through the transmitter electrodes 16A, 16B. The EM sensors 20 will be explained in more detail below with reference to FIG. 5. The recording buoys 22 may include telemetry devices (not shown separately) to transmit the detected signals to the recording system 12 on the vessel 10, and/or may store the signals locally for later interrogation by the control/recording system 12 or by another interrogation device. Alternatively, the sensors' signals may be locally and autonomously recorded, and such recordings may be retrieved at the end of the survey.

The current source (not shown separately) in the control/recording system 12 is coupled to the electrodes 16A, 16B by a cable 14A. The cable 14A is configured such that the electrodes 16A, 16B can be towed essentially horizontally near the water bottom 13 as shown in FIG. 3A. In the present embodiment, the electrodes 16A, 16B can be spaced apart by about 50 meters, and can be energized such that about 1000 Amperes of current flows through the electrodes 16A, 16B. The foregoing spacing and current produces an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) that is switched off at a signal recording time index equal to zero. It should be understood, however, that switching DC off is only one implementation of electric current control that is operable to induce transient electromagnetic effects. In other embodiments, the electric current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source.* Geophysics, 45, 1276-1296 for a description of PBRS switching.

In the present embodiment, as the current through the transmitter electrodes 16A, 16B is switched, a time-indexed recording of electric and/or magnetic fields detected by the various EM sensors 20 is made, either in the recording buoys 22 and/or in the control/recording system 12, depending on the particular configuration of recording and/or telemetry equipment in the recording buoys 22 and in the control/recording system 12.

FIG. 3B shows another implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 3B. Energizing the electrodes 16A, 16B, detecting and recording signals is performed substantially as explained above with reference to FIG. 3A. Some embodiments may include both the cable 14B as shown in FIG. 3B, as well as a cable such as cable 14A shown in FIG. 3A to be able to acquire signals induced by both vertical electric polarization as well as horizontal electric polarization. Still other embodiments may include rotation of the electric field imparted into the subsurface by applying selected fractions of the electric current to both the vertical electrode dipole (cable 14B in FIG. 3B) and the horizontal electric dipole (cable 14A in FIG. 3A).

Referring once again to FIG. 3A, in the present embodiment, the vessel 10 or another vessel (not shown) may also tow a seismic energy source, shown generally at 9. The seismic energy source 9 is typically an array of air guns, but can be any other type of seismic energy source known in the art. The control/recording system 12 can include control circuits (not shown separately) for actuating the seismic source 9 at selected times, and recording circuits (not shown separately) for recording signals produced by seismic sensors. In the present embodiment, the ocean bottom cables 18 may also include seismic sensors 21. The seismic sensors 21 are preferably "four component" sensors, which as known in the art include three orthogonal geophones or similar motion or acceleration sensors collocated with a hydrophone or similar pressure responsive sensor. Four component ocean bottom cable seismic sensors are well known in the art. See, for example, U.S. Pat. No. 6,021,090 issued to Gaiser et al.

FIG. 4 shows a typical arrangement of ocean bottom cables 18 having EM sensors 20 and seismic sensors 21 at spaced-apart positions thereon for acquiring a three dimensional survey according to the invention. Each cable 18 may be positioned essentially along a line in a selected direction above a portion of the Earth's sub surface that is to be surveyed. The longitudinal distance between the EM sensors 20 and seismic sensors 21 on each cable 18 is represented by x in FIG. 4, and in the present embodiment may be on the order of 100 to 200 meters. For practical purposes the individual sensors 20 and 21 may be co-located. Each cable 18 is shown as terminated in a corresponding recording buoy 22, as explained above with reference to FIG. 3A. The cables 18 are preferably positioned substantially parallel to each other, and are separated by a lateral spacing shown by y. In the present embodiment, y is preferably substantially equal to x, and is on the order of about 100 to 500 meters. In some embodiments, the EM sensors 20 and seismic sensors 21 may be randomly distributed, that is, spacings x and y between adjacent sensors may be random. The sensors 20, 21 may also be autonomous recoding devices without cabled connection to the respective recording buoys. It is only necessary in such embodiments to know the geodetic position of each EM sensor and each seismic sensor, and that the average separation is as described above. It is believed that random spacing may improve signal to noise ratio in the results of an electromagnetic survey in particular. For a two dimensional survey, only one such streamer is required, and the vessel 10 may pass only once along this line.

Figure 3D:
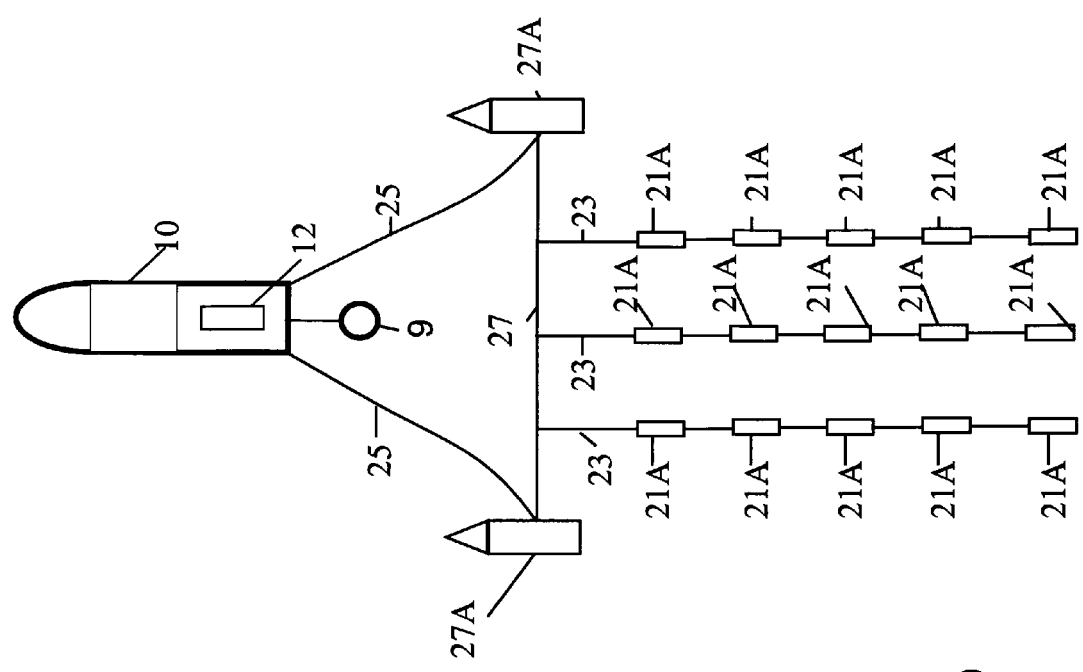
FIG. 3D shows an embodiment of a water surface streamer-type acquisition system.

Seismic and electromagnetic survey data that may be used in various embodiments of the invention may also be acquired using surface acquisition equipment, as shown in FIG. 3D. The acquisition system shown in FIG. 3D includes the survey vessel 10 and recording system 12 thereon. The vessel 10 may tow one or more seismic energy sources 9 or arrays of such sources in the water. The vessel 10 tows a plurality of sensor streamers 23 each having a plurality of spaced apart sensors 21A thereon. The sensors 21A may be seismic sensors, electric field or magnetic field sensors, or any combination thereof. The streamers 23 are maintained in lateral positions with respect to each other by towing equipment that includes lead in cables 25 coupled to the vessel 10. The lead in cables 25 are laterally separated by the action in the water of paravanes 27A coupled to the distal ends of the lead-in cables 25. The paravanes 27A are held at a selected lateral spacing by a spreader cable 27. The streamers 23 are affixed to the spreader cable 27. The sensors 21A, if they include seismic sensing devices, may include hydrophones or other pressure or pressure gradient sensors, or may be pressure-responsive sensors in combination with various forms of particle motion sensors, such as geophones or accelerometers. See, for example, U.S. Patent Application Publication No. 2004/0042341 filed by Tenghamn et al. for a description of a "dual sensor" streamer and its application. Other embodiments may include more or fewer such streamers 23. Accordingly, the configuration of seismic data acquisition system described above is not a limit on the scope of the invention. The embodiment shown in FIG. 3D may also include, although not shown in the Figure, current source electrodes in a horizontal and/or vertical dipole arrangement, as explained with reference to FIG. 3A and FIG. 3B, respectively.

Referring once again to FIG. 3A, in conducting a survey, the vessel 10 moves along the surface of the water 11, and periodically the control/recording system 12 energizes the transmitter electrodes 16A, 16B as explained above. In the present embodiment, the transmitter electrodes 16A, 16B are energized at selected times such that the vessel 10 moves about 10-100 meters between successive energizations of the transmitter electrodes 16A, 16B. Signals detected by the various EM sensors 20 are recorded with respect to time, and such time is indexed related to the time of energizing the electrodes 16A, 16B. By recording with such time indexing, inferences concerning the structure and composition of the Earth's subsurface may be made from the recordings.

In the present embodiment, the vessel 10 is shown moving substantially parallel to the cables 18. In another embodiment, after the vessel 10 moves in a direction parallel to the cables 18, substantially above the position of each cable 18 on the water bottom 13, then the vessel 10 may move transversely to the cables 18, along sail lines substantially above the position of corresponding EM sensors 20 and seismic sensors 21 on each cable 18 on the water bottom 13.

In some embodiments, a substantially contemporaneous seismic survey may be conducted by periodically actuating the seismic energy source 9, and recording the signals detected by the seismic sensors 21. In the present embodiment, therefore, a plurality of measurements are made at each EM sensor 20, each representing a unique geometry of the transmitter electrodes 16A, 16B with respect to each EM sensor 20. The plurality of electromagnetic measurements, each with a unique arrangement of transmitter-to-sensor geometry may be used in some embodiments to produce various forms of combined or "stacked" measurements, so as to improve the quality of images generated using t-CSEM measurements. Similarly, a three-dimensional seismic survey is recorded.

In the present embodiment, a seismoelectric survey may also be made by periodically actuating the seismic energy source 9 and recording voltages and/or magnetic fields detected by the EM sensors 20. The seismoelectric survey, as a matter of convenience, may be recorded using the same actuations of the seismic energy source 9 as those used to conduct the seismic survey referred to above. Thus, in such embodiments, for each seismic energy source actuation, EM sensor measurements and seismic sensor measurements are recorded, such recordings being indexed with respect to time of actuation of the seismic energy source 9.

In the present embodiment, an electroseismic survey may be made by measuring signals detected by the seismic sensors 21 as the electrical current imparted across the electrodes 16A, 16B is switched. The electroseismic survey, as a matter of convenience, may be recorded using the same current switchings as are used to induce transient electric fields in the Earth's subsurface to conduct the EM survey. Thus, in such embodiments, for each current switching, EM sensor recordings are made, and seismic sensor recordings are made, indexed with respect to the current switching time.

FIG. 5 shows one embodiment of an EM sensor 20 in more detail. The EM sensor 20 may be enclosed in a housing 23 made from a dense, electrically non-conductive, non-magnetic material, such as high-density plastic, such that the EM sensor 20 will sink in the water and rest on the water bottom (13 in FIG. 3A). Electrodes 26A, 26B, 28A, 28B are positioned on the bottom of the housing 23 such that they contact the water bottom (13 in FIG. 3A). The electrodes are arranged in dipole pairs. One pair 26A, 26B can be oriented along the length of cable (18 in FIG. 4), and measures voltages along the direction of the cable. The other electrode pair 28A, 28B measures voltages induced transversely to the cable (18 in FIG. 4). The electrode pairs may span a distance of about 1 to 10 meters. The electrode pairs 26A, 26B and 28A, 28B may be coupled to a combined amplifier/digital signal processor 24 for converting the detected voltages into digital words corresponding to the voltage amplitude at selected moments in time. In some embodiments, electrode pairs from a plurality of sensors may be selectively connected together, or may be selectively coupled across the input terminals of a selected one of the combined amplifier/digital signal processors 24 in one of the sensors 20. By making such selectively combined coupling and selective amplifier input coupling, it is possible to change the effective electrode array length, and to reduce certain kinds of noise that are localized to one or more of the individual electrodes by electrically summing such electrodes with other ones of the electrodes. Those skilled in the art of seismic surveying will appreciate the similarity of coupling spaced apart electrodes together to electrically summing signals from a plurality of spaced apart hydrophones in a marine seismic streamer to attenuate the effects of acoustic energy traveling along the streamer. An embodiment of a suitable switching arrangement that can perform the foregoing function is shown in FIG. 3C. Sensors 20 substantially as explained above with reference to FIG. 5 are shown at spaced apart positions. Each sensor 20 includes one or more electrodes, shown in FIG. 3C at 27. The electrodes 27 may be coupled using suitable wiring in the cable (18 in FIG. 4) to the input of a multi pole switch 29. The output of the switch 29 is coupled to one of the amplifier/digital signal processors 24. By suitable selection, some of the electrodes 27 may be electrically connected to each other, and to one of the two amplifier inputs. The number of connected electrodes and the spacing therebetween across the input to the amplifier can be selected to obtain measurements corresponding to electric fields originating from different volumes within the Earth's subsurface.

Figure 1A:
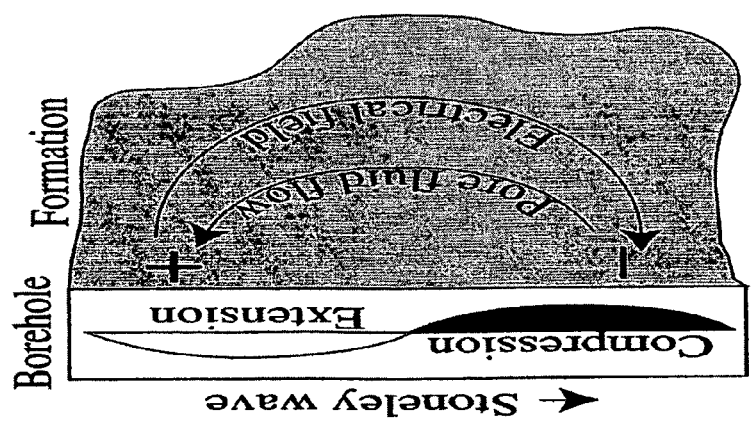
FIG. 1A shows a graphic representation of seismoelectric response of a permeable Earth formation.
Figure 2B:
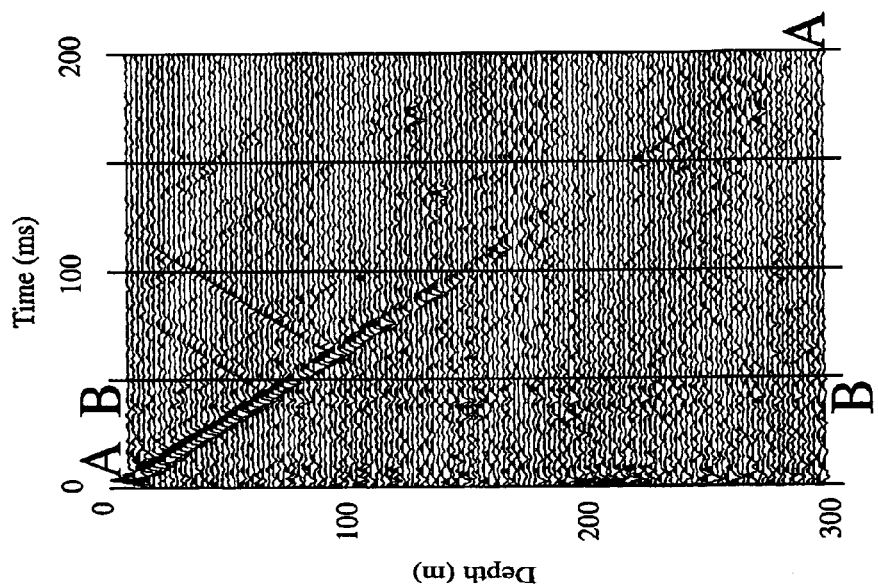
FIG. 2B shows seismoelectric response of a similar volume of the Earth's subsurface as for the seismic response of FIG. 2A.
Figure 2A:
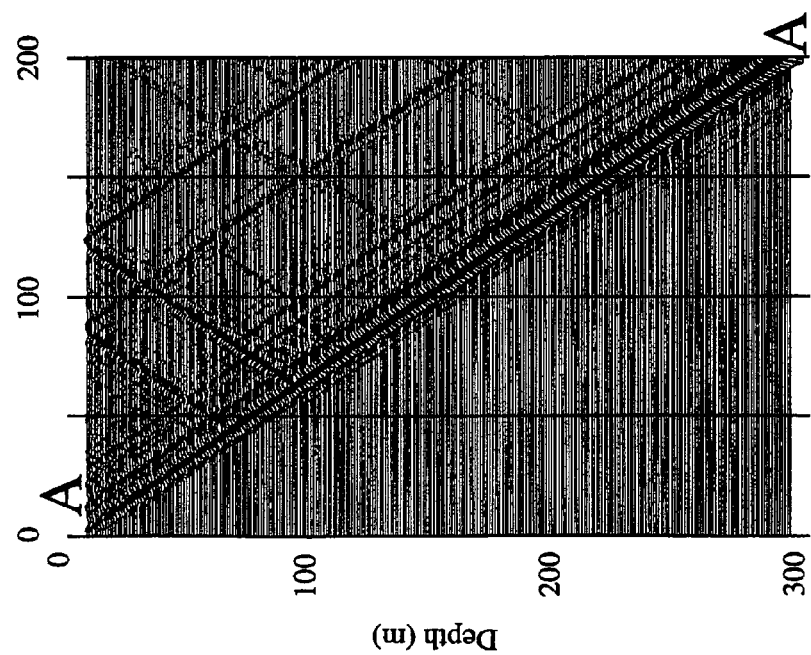
FIG. 2A shows seismic amplitude response of a volume of the Earth's subsurface in conventional form.

Referring once again to FIG. 5, the present embodiment of the sensor 20 may include one or more magnetometers 30, 32, 34 oriented along mutually orthogonal directions. In the present embodiment, two of the magnetometers 30, 32 may be oriented such that their sensitive axes are oriented along the same direction as the dipole moment of a corresponding electrode pair 26A, 26B and 28A, 28B. The signal output of each magnetometer 30, 32 34 may be coupled to the digital signal processor 24. The digitized signal output of the signal processor 24 can be coupled to the recording buoy (22 in FIG. 4) for transmission to the control/recording system (12 in FIG. 3A) such as by radio telemetry, or form later interrogation by the control/recording system (12 in FIG. 1A) as the recording buoy 22 is retrieved onto the vessel.

Figure 6:
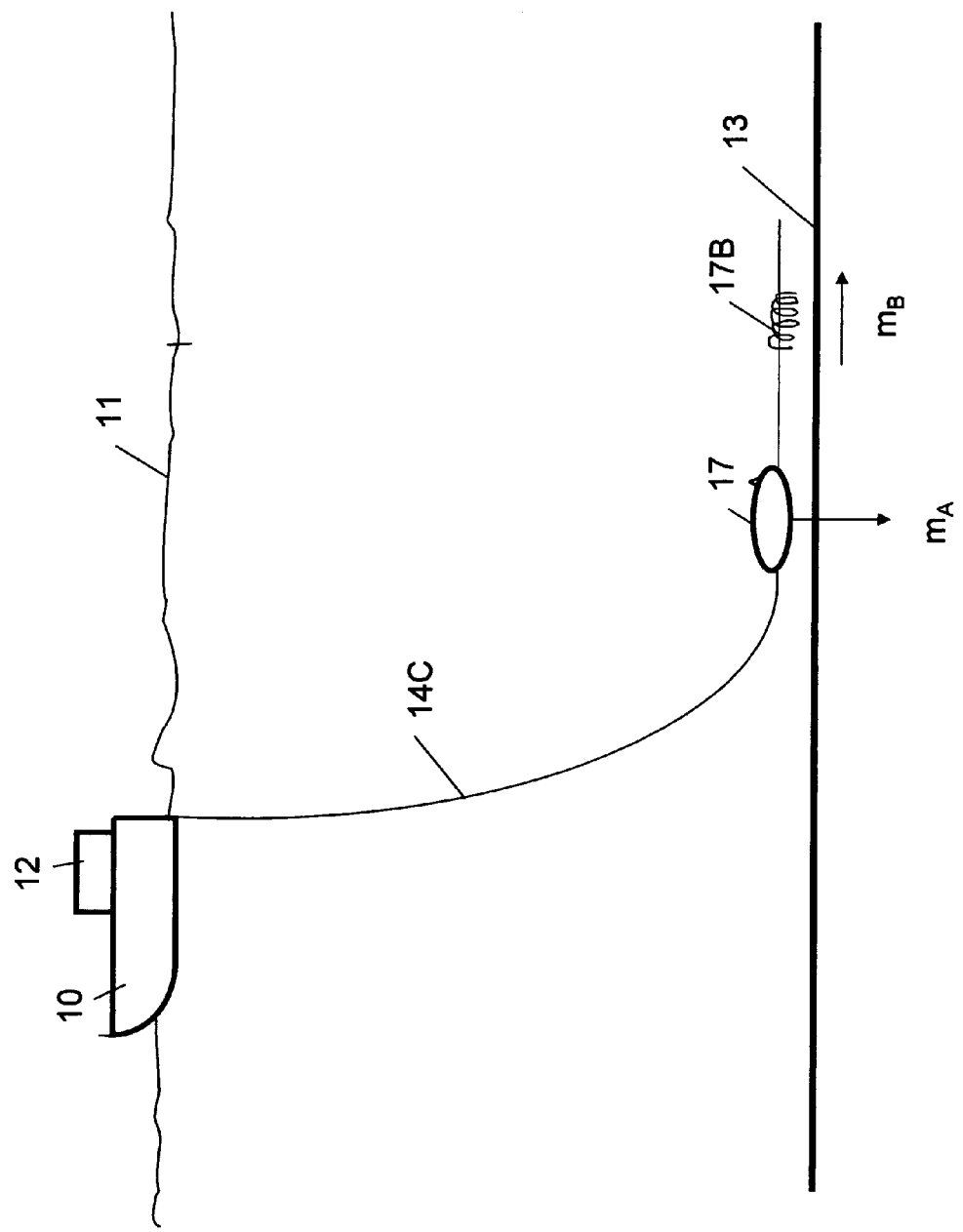
FIG. 6 shows an alternative way to the horizontal dipole to energize the Earth using magnetic fields.

The embodiment of a system shown in FIG. 3A and FIG. 3B uses electric current applied to electrodes to impart an electric field into the Earth's subsurface. An alternative to imparting electric fields is to impart magnetic fields, and such will be explained with reference to FIG. 6. In FIG. 6, the vessel 10 tows a cable 14C which is connected to two loop transmitters 17A and 17B. The first loop transmitter 17A encloses an area perpendicular to the water bottom 13. Periodically, the control/recording system 12 causes electric current to flow through the first loop transmitter 17A. The current can be in any of the same forms as described with reference to FIG. 3A, including switched DC, PBRS, and alternating polarity DC. When the current changes, a transient magnetic field having dipole moment along direction $M_A$ is imparted into the Earth. At the same or at different times, current is applied to the second loop transmitter 17B. The second loop transmitter may be in the form of a solenoid or coil, having a magnetic moment along direction $M_B$. Surveying using the magnetic field loop transmitters 17A, 17B may be performed substantially according to the survey pattern explained above with reference to FIG. 3A. In addition, FIG. 3A shows a seismic source 9 which can be used contemporaneously with or sequentially to the electromagnetic source, so as to generate seismic signals and seismoelectric signals.

The embodiments explained above with reference to FIG. 6, and the embodiments explained previously with reference to FIGS. 3A and 3B show magnetic and/or electric dipoles oriented individually along directions that are orthogonal to each other. In some embodiments, orthogonal dipole antennas and/or current loops may be towed simultaneously by the vessel and energized so as to induce rotating electric and/or magnetic fields in the Earth's subsurface. Methods for generating rotating electric and/or magnetic fields are known in the art and include applying selected fractional amounts of the total electric current to each of the orthogonal antennas and/or current loops.

The foregoing embodiments have been explained in the context of marine electromagnetic surveying. It should be clearly understood that the foregoing embodiments are equally applicable to surveys conducted on land at the surface of the Earth. When conducted on land at the surface of the Earth, the sensors can be deployed in substantially similar patterns to that shown in FIG. 3A. The survey current source may be applied in the form of electric current, as shown in FIG. 3A, at the Earth's surface, or in the form of magnetic fields, as shown in and described with reference to FIG. 6. For purposes of defining the scope of the invention, the various survey devices can be said to be disposed at the top of an area of the Earth's subsurface to be surveyed. The top of the Earth's subsurface will be at the bottom of the water in a marine survey, and at the surface of the Earth in a land based survey, or on the top of a layer of floating ice where such surveys are to be conducted.

Those skilled in the art will appreciate that the various embodiments described herein which include a moving electromagnetic and seismic energy source and stationary sensors are functionally equivalent to corresponding embodiments wherein the electromagnetic energy sources and seismic energy sources are stationary, such as being positioned on the water bottom in a pattern similar to those shown in the Figures where the EM sensors 20 and seismic sensors 21 are located, and electromagnetic sensors and seismic sensors are moved through the water. Accordingly, in the appended claims, references to positions of electromagnetic and seismic sources and sensors are intended to include such corresponding source and sensor locations within their scope. The functional equivalence is a result of the principle of reciprocity, known to those skilled in the art. It should also be clearly understood, and as explained above with reference to FIG. 3D, that both the seismic energy source and sensors, as well as the electromagnetic source and EM sensors may be towed by the vessel (10 in FIG. 3A). In the case of the seismic source and sensors, such arrangement will be familiar to those skilled in the art of seismic surveying as including towing a source array and one or more streamers. A streamer is essentially a cable having sensors embedded therein at spaced apart locations along the length of the cable. For the electric and/or magnetic field induction and measuring, source electrode cables, or loop antenna cables such as shown, respectively, in FIGS. 3A, 3B and 6 may be towed from the same vessel as the seismic survey devices explained above. Similarly, EM sensors, such as explained above with reference to FIG. 5, may be affixed to cables towed in the water by the vessel (10 in FIG. 3A), also as explained with reference to FIG. 3D. Thus, substantially contemporaneous seismic data, electroseismic data, seismoelectric data and transient electromagnetic data can be acquired over a large area of the Earth's subsurface relatively efficiently using such a system.

Another type of data that may be acquired using the system shown in FIG. 3A is called induced polarization data. Induced polarization refers to an electrical anomaly in the Earth's subsurface caused by imparting an electric field into the Earth. Measurements of certain characteristics of voltages impressed on electrodes disposed between the positions of other electrodes used to impart the electric field are used to infer the presence of hydrocarbon-bearing structures. A procedure for obtaining induced polarization (IP) data, and a procedure for processing the same, are described in U.S. Pat. No. 4,446,434 issued to Sternberg and incorporated herein by reference. The system shown in FIG. 3A may be used to acquire IP data by applying a voltage across the electrodes 16A, 16B, and measuring the voltages imparted across selected ones of the electrodes in the various EM sensors 20 disposed between the electrodes 16A, 16B on the cable 14. The purpose for acquiring IP data will be explained below with reference to FIG. 7.

Figure 7:
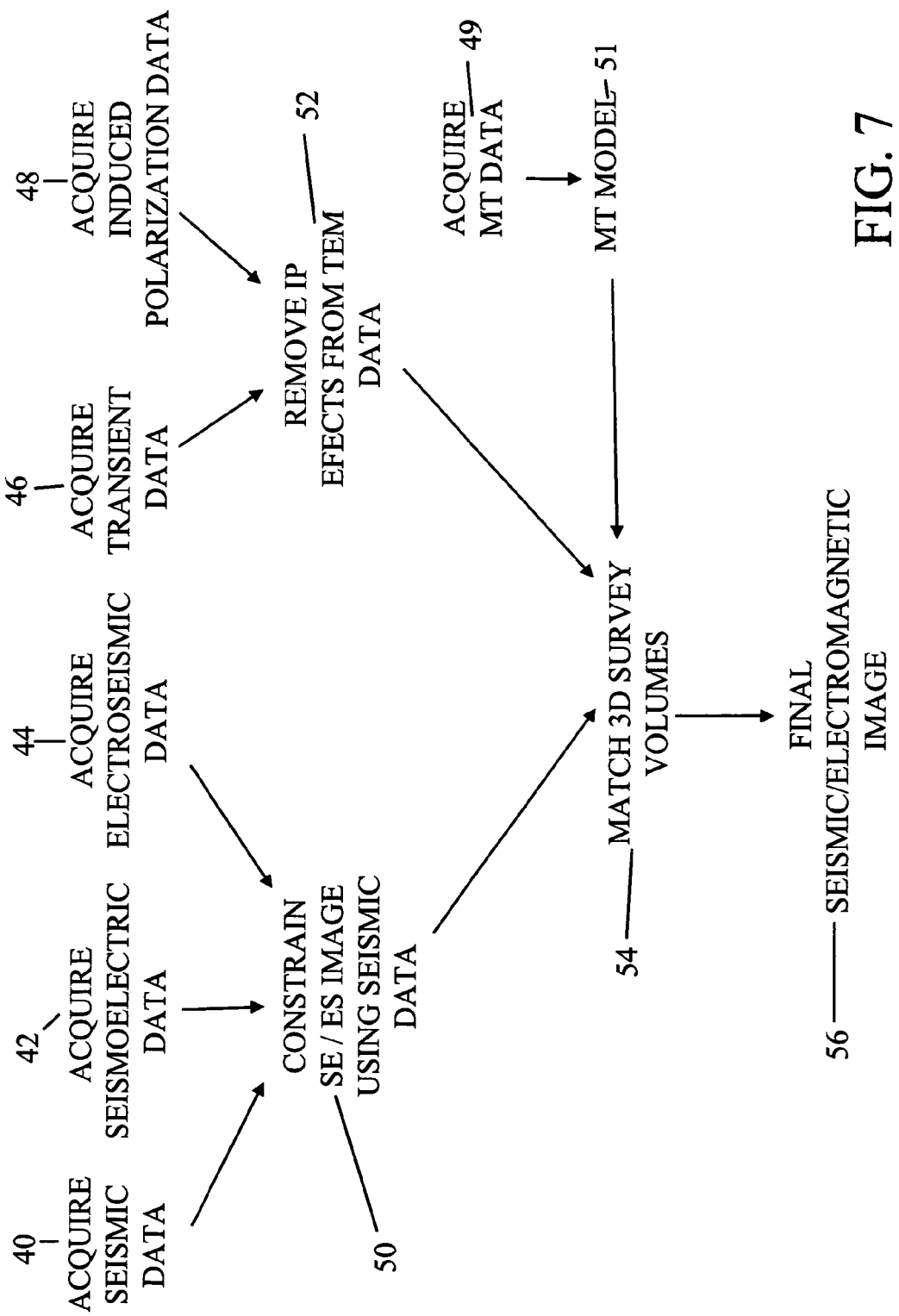
FIG. 7 shows a flow chart of one embodiment of a processing and interpretation method according to the invention.

FIG. 7 shows a process according to one aspect of the invention for using the above described forms of data to infer structure and composition of selected volumes of the Earth's subsurface. At 40, seismic data are acquired as explained above with reference to FIGS. 3A and 3B. As will be appreciated by those skilled in the art, the various data recordings of the seismic data will each relate to a particular geodetic position in the Earth's subsurface. The geodetic position depends on the particular acquisition geometry of each trace in the seismic data. More specifically, various events in the seismic data will correspond to subsurface acoustic impedance boundaries, called reflectors. The geodetic position of such reflectors may be inferred by known propagation properties of the seismic energy as it travels from the source (9 in FIG. 3A), through the Earth, is reflected back upwardly and is ultimately detected by the various seismic sensors (21 in FIG. 3A). The propagation path of the seismic energy from the seismic source to the reflector and back to the seismic sensor is related to the geodetic position of the seismic source and the particular seismic sensor at the time of acquisition. For purposes of improving signal-to-noise ratios in the acquired seismic data, it is known in the art to sum or "stack" seismic signal recordings corresponding to a common travel path element. The most common of the foregoing is called common-midpoint (CMP) stacking, in which recordings are summed which correspond to a geodetic position at the mid point of various source and sensor positions. In CMP stacks, it is likely that reflective events in the seismic traces correspond to the same point in space along such reflectors because of the acquisition geometry.

At 42 and 44, respectively, the seismoelectric and electroseismic data are acquired, substantially as explained above with reference to FIGS. 3A and 3B. Because the position of the seismic energy source (9 in FIG. 3A) is known for each actuation thereof, the geodetic position of events in the Earth's subsurface that generate seismoelectric signals can be determined. In some embodiments, the geodetic position of the various events in the seismoelectric and electroseismic data may be inferred by determining differences between arrival times (arrival time being the elapsed time from actuation of the respective source to detection of the event) of events in such data that are caused by compressional seismic energy, and events caused by shear energy. Such geodetic information can be used, as shown at 50, with the seismic data to constrain an image generated using the seismoelectric data to a same three-dimensional volume of the Earth's subsurface. A similar process can be applied to the electroseismic data because the geodetic position of the electrodes (16A, 16B in FIG. 3A) is known for each current actuation. Further explanation of constraining the seismoelectric data and the electroseismic data to correspond to a same 3-dimensional volume in the Earth's subsurface will be provided below with reference to FIGS. 8A through 8D.

Still referring to FIG. 7, at 46, t-CSEM data are acquired as explained above with reference to FIGS. 3A and 3B, as well as or alternatively, as explained with reference to FIG. 6. At 48, IP data may be acquired using the system explained with reference to FIGS. 3A and 3B. At 52, the IP data are used to remove the effects thereof from the t-CESM data. As will be appreciated by those skilled in the art, the t-CSEM data relate to specific volumes of the Earth's subsurface, depending on the geodetic position of the electrodes (16A, 16B in either FIG. 3A or 3B) or the loop antennas (17A, 17B in FIG. 6), depending on which type of EM source device is used. The IP corrected t-CESM data may then be used to generate a model of spatial distribution of electrical conductivity in the Earth's subsurface. At 54, the model generated using the t-CSEM data may be volume matched to a subsurface Earth model generated using the seismoelectric data. Finally, at 56, the electrical conductivity distribution in a selected volume of the Earth's subsurface determined from the t-CSEM data may be used with corresponding seismoelectric data to generate a seismoelectric image that takes account of the determined conductivity distribution.

In some embodiments of a method according to the present aspect of the invention, magnetotelluric (MT) data may be acquired as shown at 49. The MT data may be used either to determine a background electromagnetic field distribution to correct the TEM data, or may be used to generate a separate model of the Earth's subsurface. Typically, models of the Earth's subsurface made using MT data show the distribution of so-called "basement" rocks, meaning those formations below the bottom of sedimentary rocks.

In order to improve the signal-to-noise ratio of the t-CSEM data, the data may be summed or stacked in a manner similar to the seismic data. Stacking EM data, similar to stacking seismic data, is performed by summing individual data recordings having events therein corresponding to the same geodetic position in the Earth's subsurface. In order to sum data recordings made when the electrodes (16A, 16B in FIG. 3A) or the loop antennas (17A, 17B in FIG. 6) are in different relative positions with respect to the EM sensors, it is necessary to adjust the individual recordings for differences in acquisition geometry (the position of the electrodes and sensors corresponding to each data recording). Those skilled in the art of seismic exploration will appreciate that such acquisition geometry correction is necessary in order to properly stack seismic recordings. Seismic recordings are commonly corrected prior to stacking by selecting seismic data recordings that represent acquisition of seismic signals having a "common mid point." Common mid point means that the location of the seismic energy source and the seismic receiver in any two recordings have the same mid point between them irrespective of the location of the source and receiver at each recording time. In the invention, signal recordings from the EM sensors (20 in FIG. 4) are selected for stacking such that the signal recordings also have a common mid point.

In seismic exploration, common mid point recordings are then processed by a procedure known as normal moveout correction. Normal moveout correction adjusts the timing of events in any seismic recording to that which would occur if the seismic energy source and the seismic receiver were collocated above the common mid point. The time correction thus adjusts event times in each recording to account for longer and longer energy travel paths for longer "offset" recordings. Such recordings are those made with longer and longer distances along the Earth's surface between the seismic energy source and the receiver.

As a generalized concept, correction for source-receiver offset in common mid point recordings can be applied to electromagnetic signal recordings. However, the correction is not necessarily made with respect to travel time. For example, one basis for correcting signal recordings for acquisition geometry is the signal amplitude. For a signal recording made using electric current amplitude represented by I, and an electrode spacing represented by $\Delta l$, the DC electric field strength E in the inline direction can be determined by the expression:

$$E(\rho) = \frac{I \Delta l}{\pi \sigma_0 (1 + \sigma_1 / \sigma_0) \rho^3} \quad (1)$$

in which $\sigma_1$ represents the electrical conductivity of the subsurface, $\sigma_0$ represents the electrical conductivity of the water, and $\rho$ represents the transmitter to receiver distance or offset (cf. Edwards, R. N., and Chave, A., 1986, *A transient electric dipole-dipole method for mapping the conductivity of the sea floor*: Geophysics 51, 984-987). The electric field amplitude in the transverse direction is calculated by a formula with similar offset dependence. Similar formulas can also be derived for magnetic field strength. As a result, the electric field at offset $\rho$ may be corrected to that at $\rho_0$ (zero offset) the equation $$E(\rho_0) = E(\rho) \frac{\rho^3}{\rho_0^3} \quad (2)$$

After such correction. recordings acquired with different offsets may be stacked. In some embodiments, the stacking may be a form of stacking known as median stacking so as to further reduce transient noise effects in the stacked recording.

Having explained the data that may be used in a method according to the invention and a method of jointly interpreting such data in general terms, a particular element of the invention will be explained in more detail. The particular element is matching the 3-dimensional survey volumes represented by each type of data such that the joint interpretation is made over matching volumes of the Earth's subsurface.

Figure 8A:
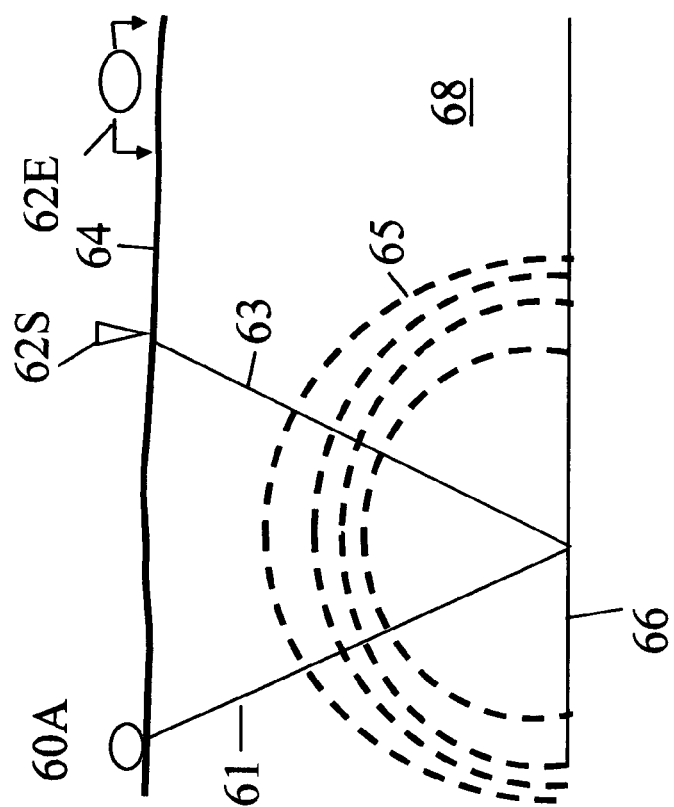
FIGS. 8A through 8D show, respectively, energy paths for seismic generation and detection and seismoelectric energy, a seismic trace, seismoelectric detection, and electroseismic energy generation and detection.
Figure 8B:
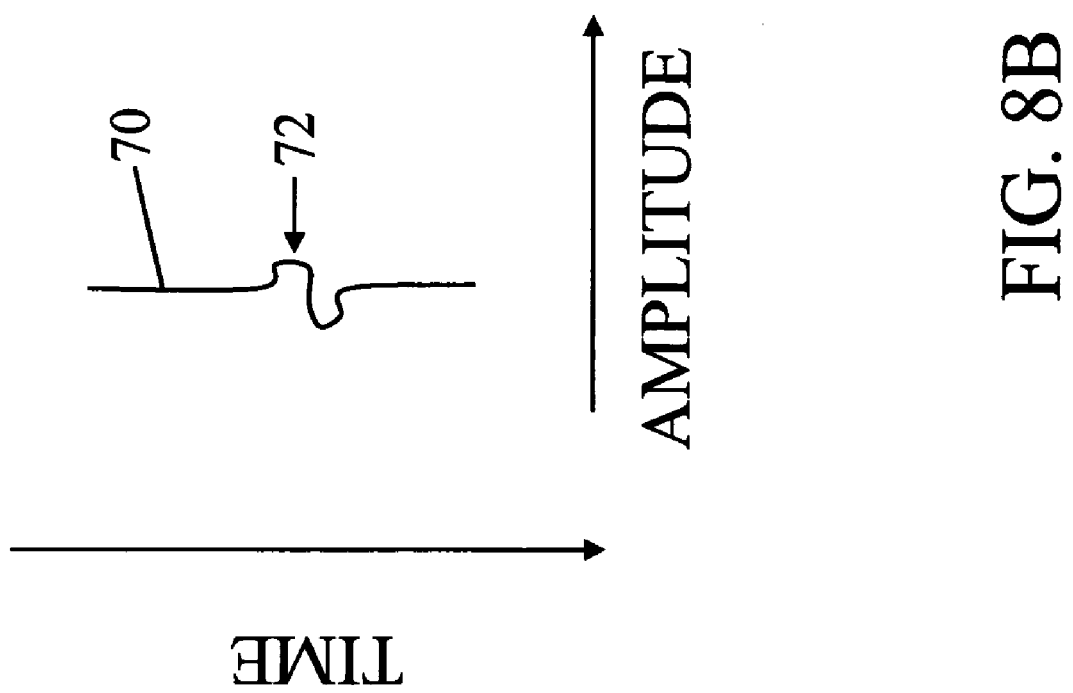

FIG. 8A shows seismic data acquisition along with seismoelectric data acquisition to explain one part of volume matching. A seismic source 60A is positioned at a selected location on the Earth's surface 64 (or water surface in a marine survey). The source is actuated and seismic energy travels down at 61 until it reaches a subsurface acoustic impedance boundary, at 66. Typically, boundaries are at places where formation composition changes to a significant extent. The seismic energy is reflected upward 63 until it reaches one or more seismic sensors 62S. Referring to FIG. 8B, a data "trace" 70 is a graphic representation of the signal detected by the seismic sensor (62S in FIG. 8A). The trace 70 includes a distinct amplitude event 72 occurring at a time related to the velocity of seismic energy in the subsurface formations (68 in FIG. 8A) and the distance between the source 60A and the seismic sensor 62S. Typically, a plurality of source and sensor positions will be used in a seismic survey, such positions having various "offset" distances, offset being the distance between the source and a particular sensor location. As explained above, signals are typically summed or "stacked" that represent a common mid point (CMP) between the source position and sensor position, such that each such stacked trace represents a same reflection point in the Earth's subsurface. CMP trace analysis may also be used to perform seismic velocity analysis. Each such boundary 66 in the subsurface will typically be associated with a seismic velocity of the formations above. For each such event (72 in FIG. 8B) occurring in various CMP traces, a "moveout", or change in two way time for each event with respect to offset, can be analyzed such that the seismic velocity in each formation "layer" can be estimated. By performing such velocity analysis using a large number of different source and sensor locations, it is possible to obtain a reasonable image of the spatial distribution of various boundaries in the Earth's subsurface.

Referring once again to FIG. 8A, as explained previously, electric field sensors 62E may be positioned in a selected arrangement on the Earth's surface (or water surface in a marine survey). As the seismic energy reaches acoustic impedance boundaries, such as shown at 66 that have permeable formations below, a seismoelectric signal 68 may be generated. The seismoelectric signal 68 travels upward at the velocity of electromagnetic energy through the same formations (which is fast enough to have negligible effect on recordings made to the time scale of seismic reflections).

Figure 8C:
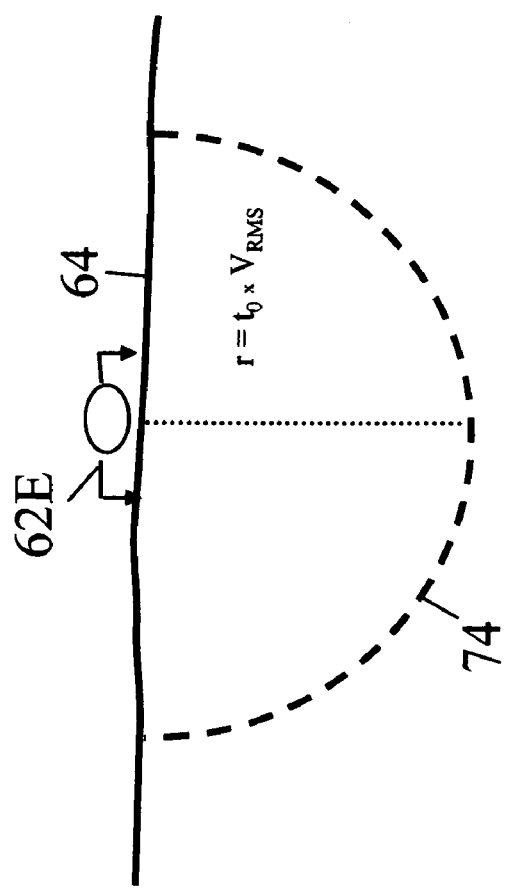

Referring to FIG. 8C, the electric field sensor 62E response will therefore correspond to seismoelectric signals that could originate from any point along a surface 74 represented by the one-way travel time of seismic energy through the same Earth formations. By estimating the velocity of the Earth formations from the surface 64 to the boundaries (66 in FIG. 8A), the radius of the surface 74 may be estimated. The actual origin of the seismoelectric signal may be determined where the surface 74 corresponds to the spatial position of acoustic impedance boundaries in the subsurface. By using seismoelectric data from a large number of different seismic source and electric field sensor positions, a seismoelectric image having 3-dimensional volumes matched to the seismic survey may be made. It should be understood that magnetic field sensors may be used in some embodiments in addition to or in substitution for the electric field sensors 62E. The amplitude and phase characteristics of the seismoelectric events will be at least in part dependent on the conductivity distribution of the Earth formations between the source of such events and the electric field sensor 62E. As explained above with reference to FIG. 7 a model of the conductivity distribution of the Earth formations in the subsurface Earth volume corresponding to the seismoelectric survey may be obtained from the t-CSEM data. Such conductivity distribution may be used in a joint inversion process to correct the Earth model made from the seismoelectric data.

Figure 8D:
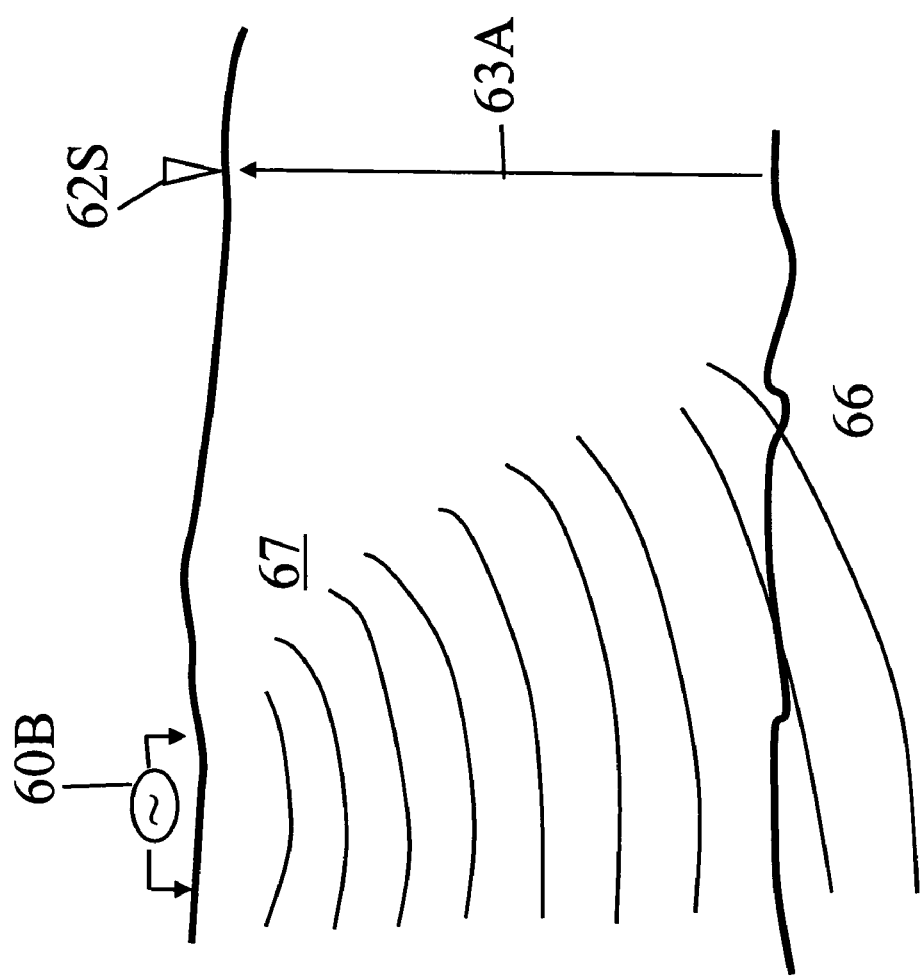

Referring to FIG. 8D, an electroseismic survey may be made over a same matched volume of the Earth's subsurface by using an electric field source 60B to impart an electric field into the Earth. The electric field radiates outwardly from the source at the propagation velocity of electromagnetic energy in the subsurface. As previously explained, the propagation velocity is such that little time effect is measured on the time scale of seismic data recordings. The phase and amplitude characteristics of the electromagnetic energy, however, will be affected by the conductivity distribution of the volume of the Earth's subsurface in which the electroseismic survey is being conducted. Seismic signals resulting from electroseismic response of the various Earth formations can be detected at one or more seismic sensors 62S, which may already be deployed on the Earth's surface (or water surface in a marine seismic survey). It will be appreciated that the characteristics of the electroseismic data will be related to the characteristics of the electromagnetic energy reaching the various formations in the Earth's subsurface, which as explained above, will be related to the conductivity distribution. As may be inferred from FIG. 8D, the time of arrival of electroseismic events will essentially depend on the seismic velocity in the Earth's subsurface (illustrated at 63A), and the seismic sensor position(s) with respect to the location where the electroseismic event is generated. By using a plurality of different source 60B and sensor 62S positions, it is possible to estimate positions in the Earth's subsurface where electroseismic events are generated.

In some embodiments, an initial model of the Earth's subsurface can be generated for each of the seismoelectric and electroseismic data. As may be inferred from the above description, such models may be constrained by using velocity and structural analysis obtained using the seismic data. Also, such models should be adjusted to account for the conductivity distribution determined from the t-CSEM data. An expected response of each of the seismoelectric data and electroseismic data may then be made based on each initial model. The expected responses are compared to the measured responses, the initial models adjusted, and expected responses recalculated until differences between the expected responses and the measured responses are minimized. Preferably, the processes for the seismoelectric and electroseismic data are performed jointly, such that a single model of the Earth's subsurface is generated that most closely accounts for both the seismoelectric data and the electroseismic data.

The foregoing embodiments have been explained in terms of transient controlled source electromagnetic (t-CSEM) survey data being used to generate a model of the Earth's subsurface. T-CSEM survey data may have several advantages over frequency domain CSEM data for purposes of the invention as will be readily appreciated by those skilled in the art. It should be understood, however, that frequency domain electromagnetic survey data may be used in other implementations.

In one embodiment, the subsurface Earth formation distribution model may be further constrained and refined by including data acquired from any wellbores drilled through the Earth formations in the survey area. Such data may include, for example, well log data. Well log data may include a record, with respect to depth in the Earth, of acoustic velocity, formation density, electrical conductivity, and neutron porosity, and clay mineral content, among other data. The well log data are generally of quite high resolution with respect to depth in the Earth, as compared to the surface-measured data discussed above; however well log data are relatively limited in the spatial volume (surrounding the well bore) to which they pertain. Thus, well log data may be used to further constrain the Earth model within the axial resolution limits of the well log data. Lateral variation in composition and structure of the Earth model may be estimated, for example, by correlating the well log data to attributes of the seismic data and t-CSEM data. See, for example, U.S. Pat. No. 6,957,146 issued to Taner et al. for a description of methods for correlating well log data to seismic attributes. Other well related data may include analysis of core samples of the Earth formations taken from the wellbore. Wellbore data may also include drilling lithology data, such as correlations between composition of the formations and rate of drilling of the wellbore. The wellbore data may also include measurements of fluid pressure in the Earth formations. Any or all of the foregoing may be used as constraints for the Earth model. A result of the further constrained interpretation is a final Earth model that includes spatial distribution of various Earth formation properties such as lithology, porosity, fluid saturation (and its converse hydrocarbon saturation), permeability and other properties. Such spatial distribution of properties of the Earth's subsurface may be used to more precisely locate subsurface hydrocarbon reservoirs in parts of a survey area using only data acquired from the Earth's surface and/or seabed.

In a particular implementation of an integrated interpretation method according to the invention, t-CSEM and/or seismic measurements may be repeated over the same geographic area at selected times to monitor movement of a hydrocarbon/water contact surface, or a gas/oil contact surface in a subsurface reservoir. In such implementation, geophysical measurements are made substantially as explained above with reference to FIGS. 3A through 6. A spatial distribution of a fluid contact, such as a hydrocarbon/water contact or a gas/oil contact is determined using a combined interpretation technique, substantially as explained above. At selected times after hydrocarbon production is commenced from the subsurface reservoir, at least one of the t-CSEM and seismic measurements are repeated, and the spatial distribution of the contact is again determined, such as by combined interpretation as explained above. In some embodiments, gravity measurements may be repeated at selected times in order to assist in determining changes in spatial distribution particularly of a gas-bearing subsurface reservoir. If suitable wellbores are available that penetrate the reservoir, measurements of formation properties may be made from such wellbores, so that the resolution of the calculated spatial distribution may be improved. Suitable wellbores may include fluid producing or injection wellbores, for which fluid production or injection is temporarily suspended so that measurements may be made from such wellbores. Other embodiments may provide permanent "monitoring" wellbores within the subsurface reservoir. See, for example, U.S. Pat. No. 6,739,165 issued to Strack, entitled, Combined surface and wellbore electromagnetic measurement system and method for determining formation fluid properties, and assigned to the assignee of the present invention for a description of the types of wellbore measurements applicable to fluid contact monitoring. Such measurements include, but are not limited to, interval acoustic velocity, formation electrical resistivity; density (either scattered gamma-gamma or differential gravity) and thermal neutron capture cross section.

In some implementations, the joint interpretation may be matched to or constrained by production history information from the modeled subsurface reservoir. Production history matching includes determination of the volumes of fluids removed from or injected into the reservoir at reservoir pressure and temperature conditions, such that changes in the spatial distribution of the fluid contact calculated by repeating the process shown in FIG. 6 using later-acquired data may be constrained or matched to estimations of how such fluid contact distribution would change in respect of the calculated fluid volumes extracted from the reservoir.

In some implementations, the modeled spatial distribution of the fluid contact determined from repeated performance of the integrated interpretation shown in FIG. 6 can be compared with modeled change in spatial distribution of the fluid contact determined from a reservoir simulation computer program. Such computer programs accept as input data such as seismic data, well log data, core analysis data, pressure measurements, fluid pressure/volume/temperature (PVT) data and other measurements related to the physical properties of and the spatial distribution of fluids in the subsurface reservoir, as well as production and injection histories at the various boreholes. The reservoir simulation program may be used to predict production rates, with respect to time, of fluids from the subsurface reservoir with respect to simulated or actual wellbores that intersect the reservoir. The simulator results may be compared with the modeled spatial distribution of the fluid contact at various times in order to constrain or adjust the results of the integrated interpretation. Reservoir simulation computer programs are commercially available such as those sold under the trademarks VIP by Landmark Graphics Corp., Houston, Tex., or sold under the trademark ECLIPSE by Schlumberger Technology Corp., Sugar Land, Tex.

The model of the Earth's subsurface produced from the seismoelectric and electroseismic data is preferably jointly inverted with the electromagnetic survey data to produce a seismoelectric model of the Earth's subsurface that includes the effects of the spatial distribution of electrical conductivity. The electromagnetic survey data preferably is constrained by using MT data to model the basement rock distribution, and preferably includes adjustment for induced polarization effects as explained above.

In some embodiments, the results of the interpretation technique explained above may be improved by beamforming on any or all of the data. Beamforming may be performed by deploying a plurality of sources (seismic and/or electromagnetic) at selected positions along the Earth's surface or water surface, and actuating the sources with a selected time delay between actuations at each individual source. The time delay is selected such that the seismic and/or electromagnetic energy propagates approximately as a plane wave. A propagation direction of the plane wave may be selected by suitable selection of time delay between actuations of each of the sources. By selecting different directions of propagation of the seismic and/or electromagnetic energy, it is possible to energize ("illuminate") any particular portion of the Earth's subsurface from different directions, depending on the position of the sources and sensors at the Earth's surface (or water surface). Beamforming can be performed for the seismic data, seismoelectric data and electroseismic data as explained, for example, in Adler, G., *Beam steering and controlled illumination*, CSEG Recorder, 8-19 (2001). Beamforming for electromagnetic data can be performed as explained in, Chen, J. C., Yao, K., and Hudson, R. E., *Source localization and forming*, IEEE, Signal Processing Magazine, March, 30-39 (2002). In some embodiments, subsurface zones indicative of relatively low electrical conductivity, and having indications of permeability by reason of seismoelectric signals, may be confirmed by illuminating such zones from various directions. Indications of the existence of the same subsurface zones with respect to various illumination directions may serve to increase the likelihood that such subsurface zones do exist and may have producible hydrocarbons therein.

The basis of beam forming/focusing during acquisition is to use extended source and/or receiver arrays. The individual energy source and/or receiver elements of such arrays are used simultaneously. For seismic sources this means many shots are fired at the same time or in a time sequence that is short duration as compared to the signal duration. Firing an extended source array at the essentially the same time will generate a plane wave traveling vertically downward. Using linear time shifts between the individual shots, plane waves traveling in any preselected dip direction may be formed. Using non-linear time shifts, non-planar waves may be formed, and such waves can be focused on certain targets in the Earth's subsurface. As can be readily inferred from the Reflection Law, a plane wave traveling vertically downward will not be reflected back to the Earth's surface by reflectors dipping steeper then 45 degrees. The foregoing example shows that for a complete scan of the subsurface a plurality of illuminations, for example with plane waves dipping in different directions, is necessary. Using electronically supervised source actuation times much more sophisticated beam forming methods are possible. A similar plurality of shots is necessary for non-planar waves. Due to the reciprocity principle all the foregoing techniques are applicable to arrays of receivers as well.

In seismic exploration, beam forming with seismic receivers is widely used, and large permanent station arrays are installed (e.g., NORSAR). Such arrays use sophisticated real time beam forming routines. Similar systems are used in seismic alarm (early warning) systems.

Beam forming/focusing is possible during acquisition and/or during processing. Both acquisition beam forming and processing beam forming techniques each have advantages and disadvantages. The main advantage of beam forming/focusing during processing is flexibility. Extension of the arrays, time shifts between elements can be selected and optimized. The principal disadvantage is the larger data volume that has to be handled, and corresponding lower signal to noise ratio. In areas with weak reflections, it is possible that the signal to noise ratio is so low that even with signal processing adequate seismic information can not be discovered during processing.

The application of beam forming/focusing during acquisition has the disadvantage that specifications such as array extension or time shifts are fixed. Due to the a priori better illumination of the target, however, signal to noise ratio may be much better in the raw data and thus be the only possibility for a successful survey.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for subsurface Earth surveying, comprising:
acquiring seismic data over a selected region of the Earth's subsurface;
acquiring seismoelectric data over a selected region of the Earth's subsurface acquiring electroseismic data over a selected region of the Earth's subsurface;
acquiring at least one type of electromagnetic survey data over a selected region of the Earth's subsurface;
matching a survey volume of the seismic data, the seismoelectric data, the electroseismic data and the transient electromagnetic data; and
generating a model of the Earth's subsurface that accounts for all of the seismic data, the seismoelectric data, the electroseismic data and the electromagnetic data.

2. The method of claim 1, further comprising acquiring induced polarization data over a same region of the Earth's subsurface as the at least one type of electromagnetic survey data and correcting the electromagnetic survey data for induced polarization effects.

3. The method of claim 1, wherein the generating a model comprises joint inversion of the seismoelectric data and the electroseismic data.

4. The method of claim 1, further comprising selecting at least one region in the Earth's subsurface, and illuminating the selected region along at least two directions by beamforming.

5. The method of claim 4, wherein the beamforming comprises actuating a plurality of seismic sources including a selected delay time between actuations of individual ones of the plurality of seismic sources.

6. The method of claim 4, wherein the beamforming comprises actuating a plurality of electromagnetic sources including a selected delay time between actuations of individual ones of the plurality of electromagnetic sources.

7. The method of claim 1, wherein the volume matching comprises generating an initial model of the Earth's subsurface using both the electroseismic data and the seismoelectric data, wherein the initial model is constrained using the seismic data.

8. The method of claim 1, further comprising acquiring magnetotelluric data in a selected region of the Earth's subsurface and adjusting the transient electromagnetic data for magnetotelluric effects.

9. The method of claim 1, wherein the acquiring at least one type of electromagnetic survey data comprises:

deploying a plurality of electromagnetic sensors in a predetermined pattern above a portion of the Earth's subsurface to be surveyed;
applying at least one of an electric field and a magnetic field to the Earth in the vicinity of the sensors at a plurality of different positions, the electric field produced by passing an electrical current through electrodes, the magnetic field produced by passing an electrical current through an antenna;
recording at least one of electric field amplitude and magnetic field amplitude at each of the sensors each time the at least one of the electric field and the magnetic field is applied to the Earth;
adjusting each recording for acquisition geometry; and
generating an image corresponding to at least one sensor position using at least two stacked, adjusted recordings.

10. The method of claim 9 wherein the electric current is transient generated by switching direct current.

11. The method of claim 10 wherein the switching comprises turning the direct current off.

12. The method of claim 10 wherein the switching comprises turning the direct current on.

13. The method of claim 10 wherein the switching comprises reversing the direct current polarity.

14. The method of claim 10 wherein the switching comprises changing the direct current polarity in a pseudo random binary sequence.

15. The method of claim 9 wherein electric field amplitudes are detected along two orthogonal directions.

16. The method of claim 9 wherein magnetic field amplitudes are detected along three mutually orthogonal directions.

17. The method of claim 9 wherein the sensors are deployed in a regular grid pattern having a spacing between sensors of about 100 to 500 meters.

18. The method of claim 9 wherein the applying comprises applying along a direction parallel to a direction of deployment of the sensors.

19. The method of claim 9 wherein the applying comprises applying along a direction perpendicular to a direction of deployment of the sensors.

20. The method of claim 9 wherein the applying comprises applying along a selected direction oblique to a direction of deployment of the sensors, or along a sequence of selected oblique directions.

21. The method of claim 9 wherein the stacked image is derived from a set of recordings with a common mid point.

22. The method of claim 9 wherein the stacked recording comprises a median stack or the like.

23. The method of claim 9 wherein the applying the at least one of electric current and magnetic fields is performed at intervals of the order of ten meters or more.

24. The method of claim 9 wherein the electric current is applied to a dipole electrode in a substantially horizontal direction.

25. The method of claim 9 wherein the electric current is applied to a dipole electrode in a substantially vertical direction.

26. The method of claim 9 wherein the magnetic field is oriented substantially vertically.

27. The method of claim 9 wherein the magnetic field is oriented substantially horizontally.

28. The method of claim 9 wherein a top of the Earth's subsurface is near a bottom of a body of water.

29. The method of claim 9 wherein the applying at least one of an electric field and a magnetic field to the Earth in the vicinity of the sensors comprises applying at least one of a rotating electric field and a rotating magnetic field.

30. The method of claim 1 further comprising constraining the model using data acquired from at least one wellbore drilled through the Earth's subsurface proximate the selected region.

31. The method of claim 1 further comprising determining a spatial distribution of a fluid contact in a subsurface reservoir.

32. The method of claim 31 further comprising, after a selected time, repeating the acquiring seismic data, acquiring seismoelectric data, acquiring electroseismic data, acquiring at least one type of electromagnetic survey data, matching the survey volume of the seismic data, the seismoelectric data, the electroseismic data and the electromagnetic data, generating a model of the Earth's subsurface and determining spatial distribution of the fluid contact so as to determine change the spatial distribution thereof.

33. The method of claim 32 further comprising:
determining a volume of fluid removed from or injected into the subsurface reservoir from the change in spatial distribution;
comparing the determined volume of fluid with volume of fluid produced from or injected into the reservoir; and
adjusting the spatial distribution such that the determined volume substantially matches the measured volume.

34. The method of claim 32 further comprising:
comparing the determined spatial distribution to a modeled spatial distribution from a reservoir simulation program; and
correcting the determined spatial distribution to substantially match the simulator modeled spatial distribution.

35. The method of claim 1 wherein the acquiring seismoelectric data comprises detecting seismoelectric signals induced by same actuations of a seismic energy source as are used to perform the acquiring seismic data.

36. The method of claim 1 wherein the acquiring electroseismic data comprises detecting electroseismic signals induced by same actuations of at least one of an electric field source and a magnetic field source as used to perform the acquiring electromagnetic data.

37. The method of claim 1 wherein the electromagnetic survey data comprise transient controlled source electromagnetic survey data.

* * * * *